UNITED STATES PATENT OFFICE.

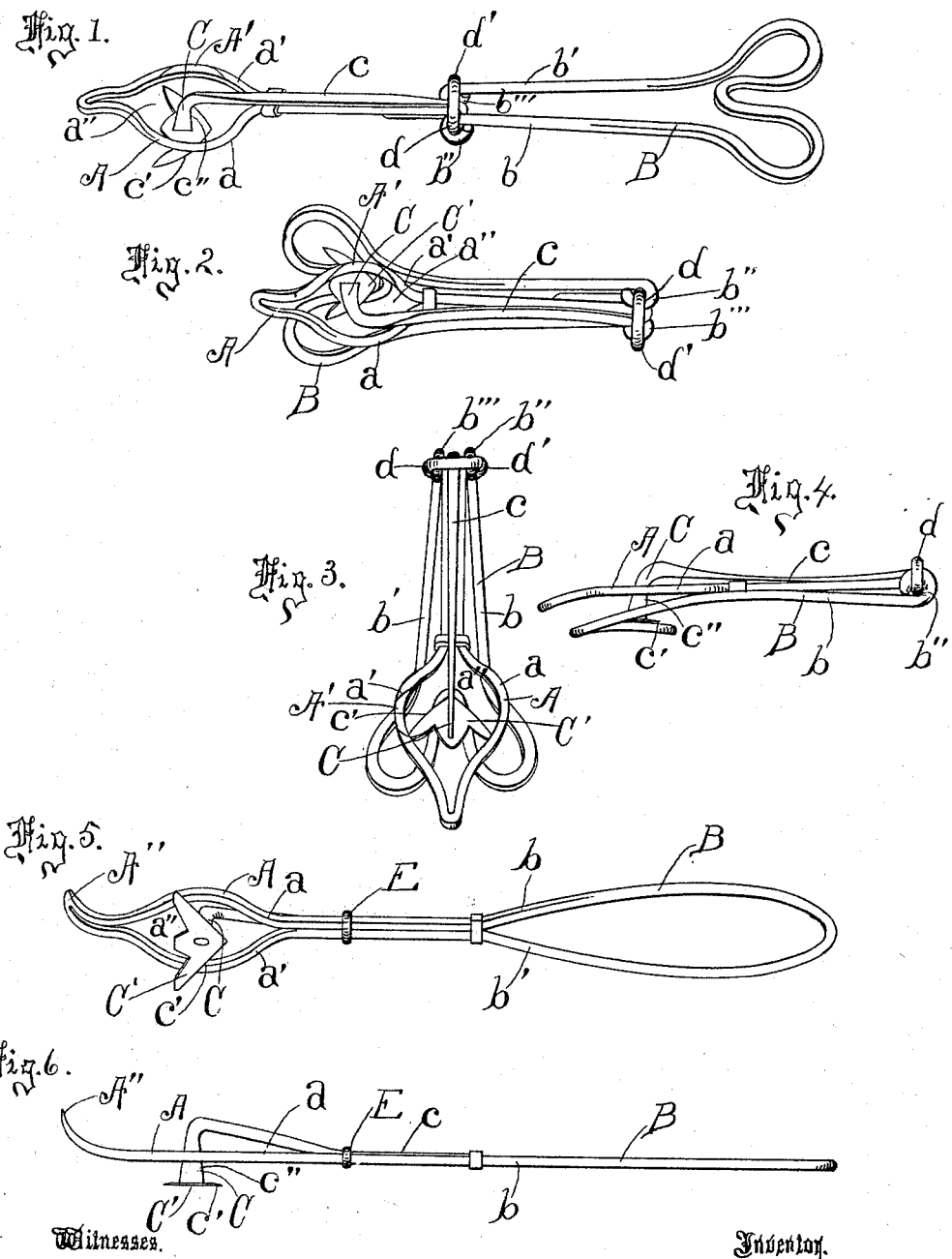

NAPOLEON B. HALE, OF SAN BERNARDINO, CALIFORNIA.

FRUIT-PEELING KNIFE.

SPECIFICATION forming part of Letters Patent No. 518,501, dated April 17, 1894.

Application filed April 24, 1893. Serial No. 471,588. (No model.)

*To all whom it may concern:*

Be it known that I, NAPOLEON B. HALE, a citizen of the United States, residing at San Bernardino, in the county of San Bernardino and State of California, have invented a new and useful Fruit-Peeling Knife, of which the following is a specification.

The object of my invention is to provide a knife which will be adapted for removing the peeling from oranges and other fruits in a rapid, convenient and efficient manner.

My invention relates more particularly to that class of knives used in severing the peel from oranges.

My invention consists of certain improvements in construction—hereinafter fully described and claimed whereby the convenience, efficiency, and ease of operation of the knife are increased.

The accompanying drawings illustrate my invention.

Figure 1 is a perspective side elevation of my improved folding fruit peeling knife in its opened position. Figs. 2 and 3 are perspective top views of my improved folding fruit peeling knife in its folded position. Fig. 4 is a side elevation of the same in its folded position. Fig. 5 is perspective bottom view of my improved fruit peeling knife adapted for table use. Fig. 6 is a side elevation of the same.

The guard of my improved fruit peeling knife is formed of two wire members $a$ $a'$ which are bent to form an oval loop $a''$ at one end and are extended at their other ends and attached to the handle B. The splitting knife C extends downward through the opening $a''$ in the guard and is arranged at substantially right angles with the guard A and at its upper end it is secured to a spring shank $c$ which is attached to the members $a$ $a'$ at the rear of the opening $a''$. To the lower end of the peel splitting knife C is secured a V shaped peel severing knife $C'$ which is arranged with its cutting edge $c'$ transverse the cutting edge $c''$ of the splitting knife C and substantially parallel with the guard A.

My improved folding joint whereby I am enabled to form the handle and guard for the folding knife entirely of wire, comprises the two guard members $a$ $a'$ each having its rear end respectively formed into a loop $d$ $d'$ arranged at substantially right angles to the guard members $a$ $a'$ and adapted to respectively encircle the members $b$ $b'$ of the handle; the two handle members $b$ $b'$ respectively arranged in the loops $d$ $d'$ of the guard members and each respectively bent downward to form a loop $b''$ $b'''$ arranged to encircle the lower portion of its respective loop $d$ $d'$. By this construction when the knife is opened the loops $d$ $d'$ engage with the members $b$ $b'$ to prevent the knife from opening too far and the knife may be closed as shown in Figs. 2, 3, and 4, to be conveniently carried in the pocket.

In practice the orange or other fruit is grasped in one hand with either the stem or blossom end arranged uppermost; the severing knife $C'$ is then placed with its point at or near the stem or blossom end of the fruit and the knife is drawn downward as in the act of quartering; the severing knife $C'$ enters beneath the peel of the fruit and severs the peel from the fruit, while the sharp edge $c''$ of the splitting knife C splits the peel as the knife is drawn downward. In practice in peeling an orange it is only necessary to divide the peel into quarters with the splitting knife and to then remove the peel by the fingers, the severing knife $C'$ severing the peel from the fruit excepting a small portion at the circumference of the fruit which will tear loose without being severed by the knife. In case it is desired to entirely sever the peel from the fruit it will be necessary to make the cuts nearer together. It will be understood that the operation of my improved peeling knife will be substantially the same if the width of the splitting blade C is arranged transverse the handle B instead of parallel therewith as shown, and I do not limit my claim to the exact construction shown.

In Figs. 4 and 5 I have shown a tension ring E arranged to encircle the guard members $a$ $a'$ and the spring shank $c$ of the splitting knife C, whereby, by sliding the tension ring back and forth along upon the guard members and the spring shank the tension or strength of the spring may be increased or diminished to force the knife C into the peel, to suit the fruit upon which the knife is being used. One of the guard members $a'$ of the folding knife is slightly sharpened as indicated at $A'$ Figs. 1, 2 and 3 to serve as a scraper to remove the tough white membrane of the orange from the fruit after the peel has been removed from the pulp of the fruit.

The table knife shown in Figs. 5 and 6 is provided with a hooked point A″ formed by sharpening the outer ends of the guard members $a\ a'$, to assist in removing the bulb from the blossom end of navel oranges.

The spring shank $c$ allows a freedom of movement to the knife C′ which causes it to enter beneath the peel of the fruit but prevents it from being forced into the pulp of the fruit by reason of undue pressure upon the guard.

Now, having described my invention, what I claim as new, and desire to secure by Letters Patent, is—

1. The fruit peeling knife set forth comprising the combination of the blade guard adapted to rest upon the peel of the fruit and provided with a suitable handle; a peel splitting blade arranged to project below the guard at substantially right angles to the guard and provided on its lower end with a transverse peel severing blade arranged substantially parallel with the guard and projecting upon each side of the splitting blade and having its other end provided with the spring shank attached to the handle upon the upper side thereof.

2. The joint set forth comprising the two guard members each having its rear end respectively formed into a loop arranged at substantially right angles to such members and to respectively encircle the members of the handle; the two handle members each respectively arranged in one of the loops of the guard members and bent to form a loop arranged to encircle the lower portion of its respective loop of the guard members.

3. The fruit peeling knife set forth comprising the combination of the blade guard adapted to rest upon the peel of the fruit and provided with a suitable handle; a peel splitting blade arranged to project below the guard at substantially right angles to the guard and provided on its lower end with a transverse peel severing blade arranged substantially parallel with the guard and projecting upon each side of the splitting blade and having its other end provided with the spring shank attached to the blade guard, and the tension ring encircling the spring shank and arranged to slide along the guard and shank to increase or diminish the tension or strength of the spring.

NAPOLEON B. HALE.

Witnesses:
 ALFRED I. TOWNSEND,
 TRUMAN REEVES,
 O. P. SLOAT.